(12) United States Patent
Van Andel et al.

(10) Patent No.: US 7,268,879 B2
(45) Date of Patent: Sep. 11, 2007

(54) COLOR MEASUREMENT ENGINE WITH PARALLEL DETECTORS

(75) Inventors: Richard J. Van Andel, Grand Rapids, MI (US); James L. Overbeck, Ada, MI (US)

(73) Assignee: X-Rite, Inc., Grand Rapids, MI (US)

( * ) Notice: Subject to any disclaimer, the term of this patent is extended or adjusted under 35 U.S.C. 154(b) by 71 days.

(21) Appl. No.: 11/116,826

(22) Filed: Apr. 28, 2005

(65) Prior Publication Data

US 2005/0243320 A1    Nov. 3, 2005

Related U.S. Application Data

(60) Provisional application No. 60/566,811, filed on Apr. 30, 2004.

(51) Int. Cl.
*G01J 3/51* (2006.01)
(52) U.S. Cl. ...................... 356/419; 250/226
(58) Field of Classification Search ................ 356/419; 250/226
See application file for complete search history.

(56) References Cited

U.S. PATENT DOCUMENTS

| | | | |
|---|---|---|---|
| 3,846,027 A | 11/1974 | Hyman et al. | |
| 4,945,250 A | 7/1990 | Bowen et al. | |
| 6,002,488 A | 12/1999 | Berg et al. | |
| 6,222,631 B1* | 4/2001 | Terauchi | 356/419 |
| 6,583,879 B1 | 6/2003 | Berg et al. | |
| 2003/0038938 A1 | 2/2003 | Jung et al. | |
| 2005/0243319 A1 | 11/2005 | Van Andel | |

FOREIGN PATENT DOCUMENTS

| | | |
|---|---|---|
| EP | 0 491 131 A1 | 6/1992 |
| WO | PCT/IB2005/051401 | 4/2005 |
| WO | PCT/IB2005/051402 | 4/2005 |

* cited by examiner

*Primary Examiner*—F. L. Evans
(74) *Attorney, Agent, or Firm*—McCarter & English, LLP

(57) ABSTRACT

A color measurement instrument includes a housing and illuminators, a two-dimensional photodetector array, and an optics system within the housing. A UV filter wheel closes the housing to prevent contaminants from entering the housing. The filter wheel supports UV filters and non-UV glass that can be selectively aligned with the illuminators. The photodetectors can be read in parallel, and each photodetector includes a unique spectral filter. The optics system delivers light from the sample target area equally to each of the photodetectors.

10 Claims, 8 Drawing Sheets

COLOR MEASUREMENT ENGINE WITH PARALLEL DETECTORS

This application claims the benefit of provisional application No. 60/566,811 filed Apr. 30, 2004, and entitled "Color Measurement Engine with UV Filtered Illumination and Parallel Detectors."

BACKGROUND OF THE INVENTION

The present invention relates to color measurement engines, and more particularly to engines including parallel detectors.

Color measurement engines are well known and widely used in a variety of color measurement instruments. Typically, the engine includes a source of illumination for illuminating a sample, one or more detectors for detecting light reflected from (or transmitted through) the sample, and one or more filters for filtering the reflected (or transmitted) light. The detectors measure the light at various frequencies within the visible spectrum and provide an output indicative of the measured light.

In the detector portion, a conventional technique is to include a single detector and a plurality of filters, and a mechanism for sequentially positioning the filters in front of the detector for serial measurements. Optics are included between the sample and the detector to focus the sample target area onto the sensor. Another technique is to include a single detector, a plurality of filters, and a light switch that sequentially directs the light passing through the filters to the detector for serial measurements. Both of these techniques have the disadvantage of serial processing of the different frequencies of light, which results in two problems. First, a significant period of time is required to acquire a color measurement. Second, in situations where the sample and the engine are moving relative one another, a different portion of the sample is in the field of view as each different frequency of light is measured. Consequently, a single color measurement does not relate to a single location on the sample, but rather is a hybrid of a range of locations.

Yet another technique in the detector portion is to include a plurality of detectors, each with its own filter. This technique permits parallel processing of the data. However, the plurality of detectors involves high part counts, leading to increased material and labor expense. This technique also involves the optical challenge of directing the light flux efficiently onto each detector. Typically, an optical system (e.g. fiber optics) is provided for each detector to direct light to the detector. Typically these optical systems are complex and expensive. If a simple optical system is used, the measurement efficiency will be low because the light energy is distributed over a large circular region with only a small percentage of that region corresponding to active detector area.

SUMMARY OF THE INVENTION

The aforementioned problems are overcome in the present invention which provides a detector section that permits multiple frequencies to be read in parallel.

The detector section includes a two-dimensional array of sensors each in combination with a unique filter. The multiple sensors can be read in parallel, greatly improving the speed at which colors can be measured. Preferably, optics are included to direct light from the sample target area generally equally onto each filter/sensor pair. Consequently, each sensor "sees" the same target area and receives the same amount of light from the target area.

These and other objects, advantages, and features of the invention will be more fully understood and appreciated by reference to the description of the current embodiment and the drawings.

DESCRIPTION OF THE CURRENT EMBODIMENT

Figure 1:
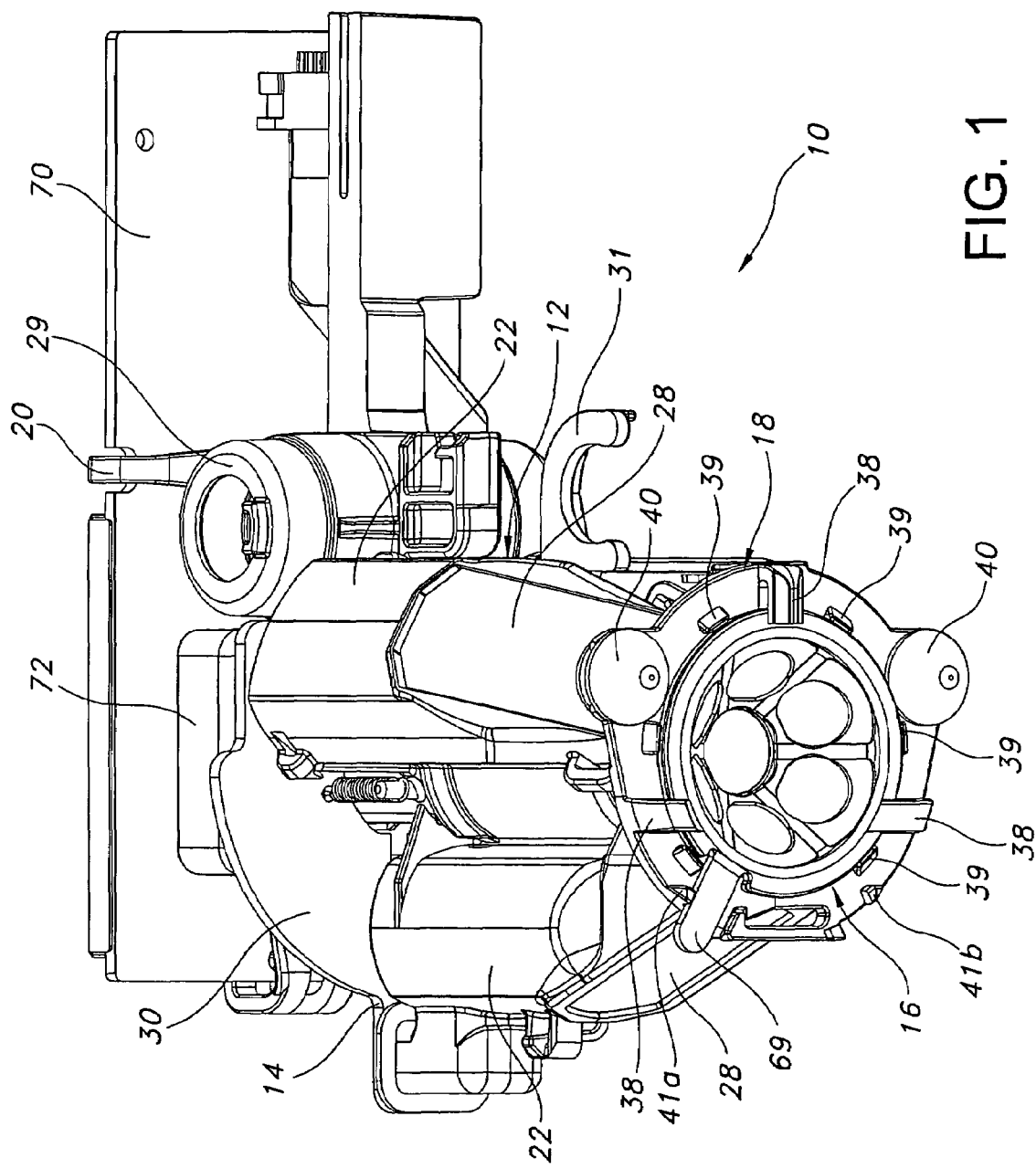
FIG. 1 is a perspective view of the color measurement engine of the present invention.

A color measurement instrument constructed in accordance with the current embodiment of the invention is illustrated in the drawings and generally designated 10. The instrument includes a housing 12, an illuminator assembly 14, a UV filter wheel 16, an optics system 18, and a detector assembly 20. The housing 12 provides support for all of the other components. The illuminator assembly 14 illuminates the sample S through the filter wheel assembly 16. The light reflected from the sample S is focused by the optics system 18 onto the sensor assembly 20. The sensor assembly outputs information indicative of the frequency content of the light reflected from the sample S.

Figure 2:
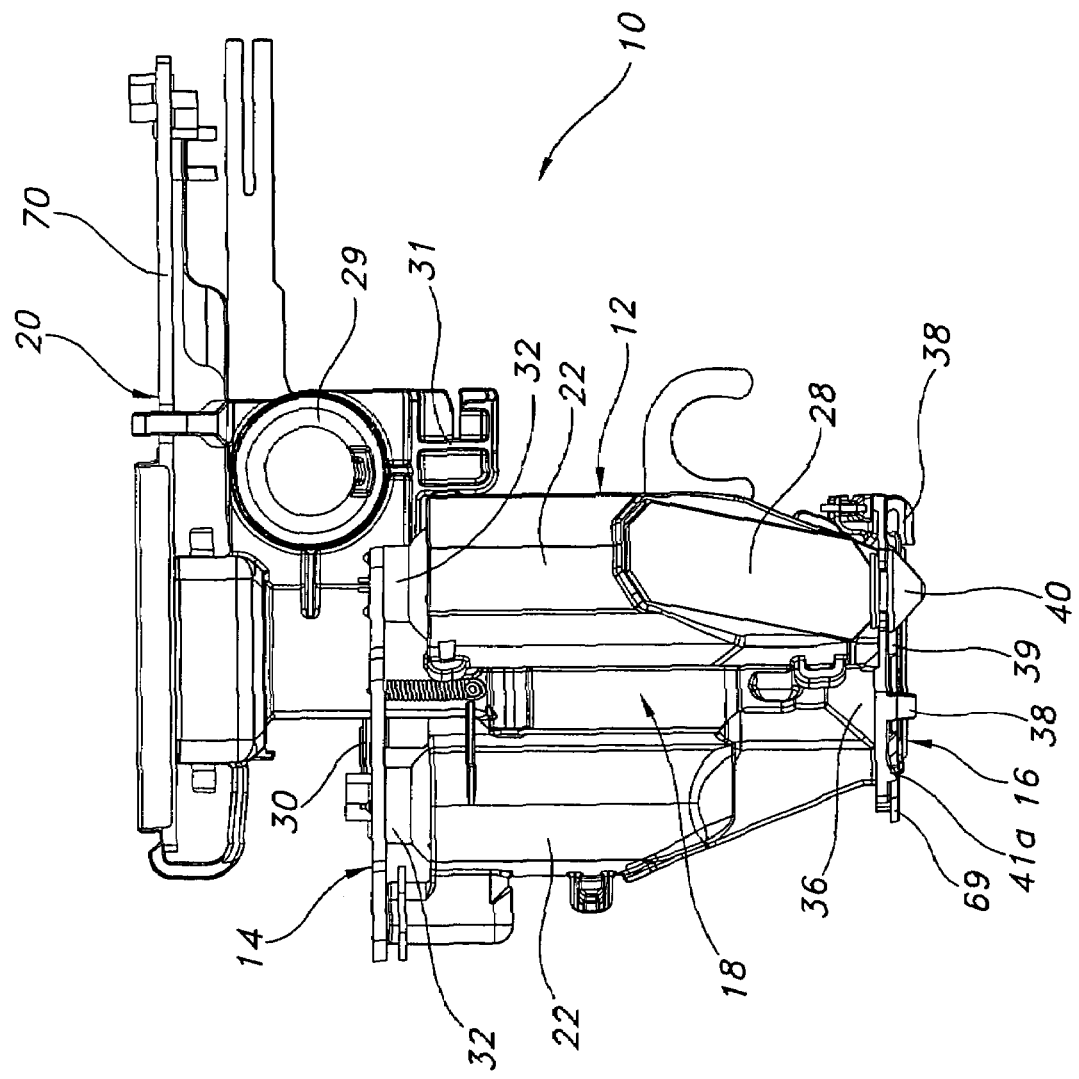
FIG. 2 is a side elevational view of the color measurement engine.
Figure 3:
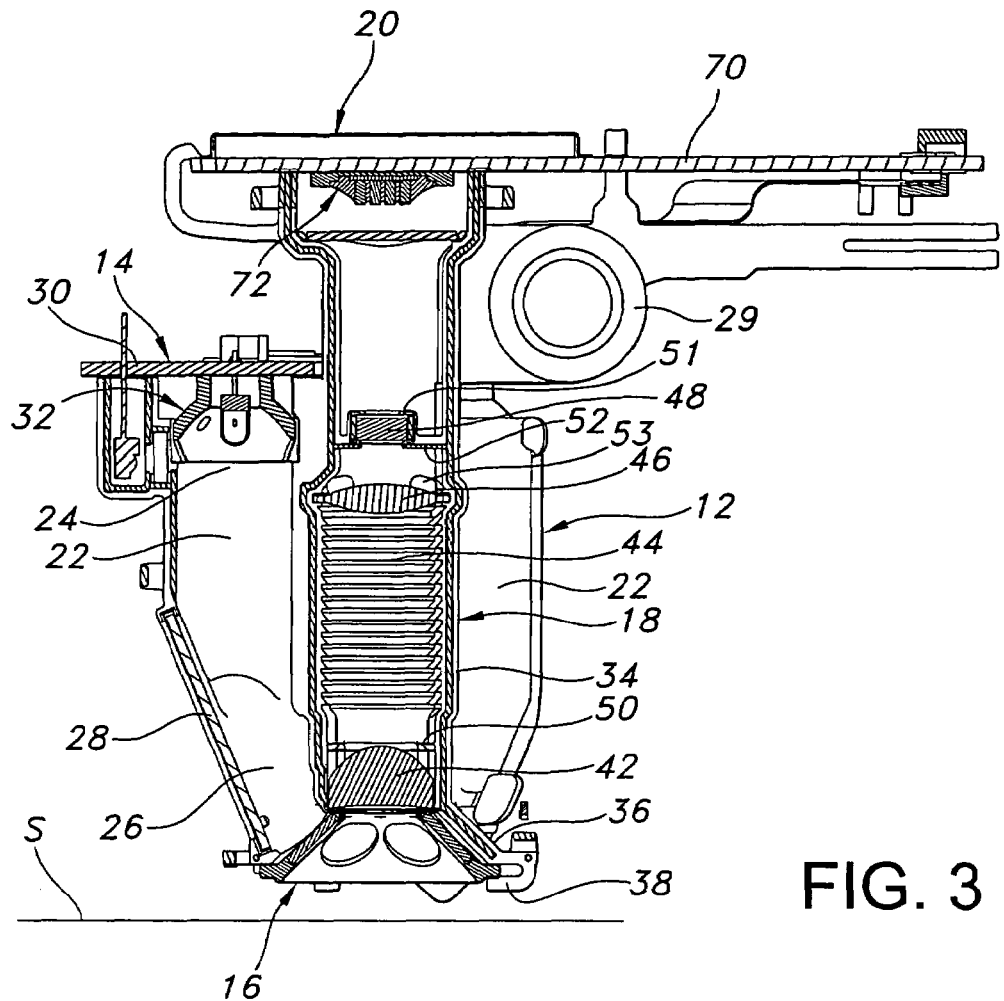
FIG. 3 is a sectional view through the color measurement engine.

The housing 12 provides support for the other components in the color measurement engine. The housing 12 defines three illumination tubes oriented 120 degrees from one another about the optics system 18. Each tube 22 includes an upper end 24 supporting a portion of the illuminator assembly 14 and a lower portion 26 supporting a reflecting mirror 28 and aligned with the filter wheel assembly 16. Each mirror 28 is oriented at an angle of approximately 22½ degrees to the axis of the tube so that light is directed onto the sample S at an angle of approximately 45 degrees. The housing includes features, such as those shown at 29 and 31 in FIGS. 1-2, to permit the instrument 10 to be mounted within a larger system (not shown).

The illumination assembly 14 includes a circuit board 30 and three lamp assemblies 32 mounted thereon. Each of the three lamp assemblies 32 is mounted on the upper end 24 of one of the light tubes 22 to direct illumination toward the sample. The lamp assemblies 32 are known to those skilled in the art. Although the current embodiment includes multiple illuminators, the present invention is equally applicable to an engine including a single illuminator.

The optics system 18 includes a body 34 which extends the full height of the color measurement engine between the filter wheel assembly 16 and the sensor assembly 20. The lower portion 36 of the optics body 34 is supported by and connected to the lower portion of the housing 12. The lower portion 36 of the optics body 36 includes a plurality of tabs 38 that support the filter wheel for rotatable or pivotable movement. The lower portion 36 further includes a plurality of guides 39 in a circular configuration to define the circular travel path of the filter wheel. The optics housing 34 also includes a plurality of feet or spacers 40. Additionally, the housing includes stops 41 that limit the movement of the filter wheel assembly 16 between the UV-included and UV-excluded positions.

The optics system 18 further includes an objective lens 42, an anti-reflective tube 44, a field lens 46, a spot-size defining aperture 52, and a common blocker 48. The common blocker 48 blocks UV frequencies below 380 to 390 nanometers (nm) and infrared (IR) frequencies above 720 to 730 nm. Stray light apertures 50 and 51 reduce undesired stray light effects. A molded spring 53 holds the field lens 46 in place, and another molded spring (not shown) holds the objective lens 42 in place. The function of the optics system is described in greater detail below.

Figure 6:
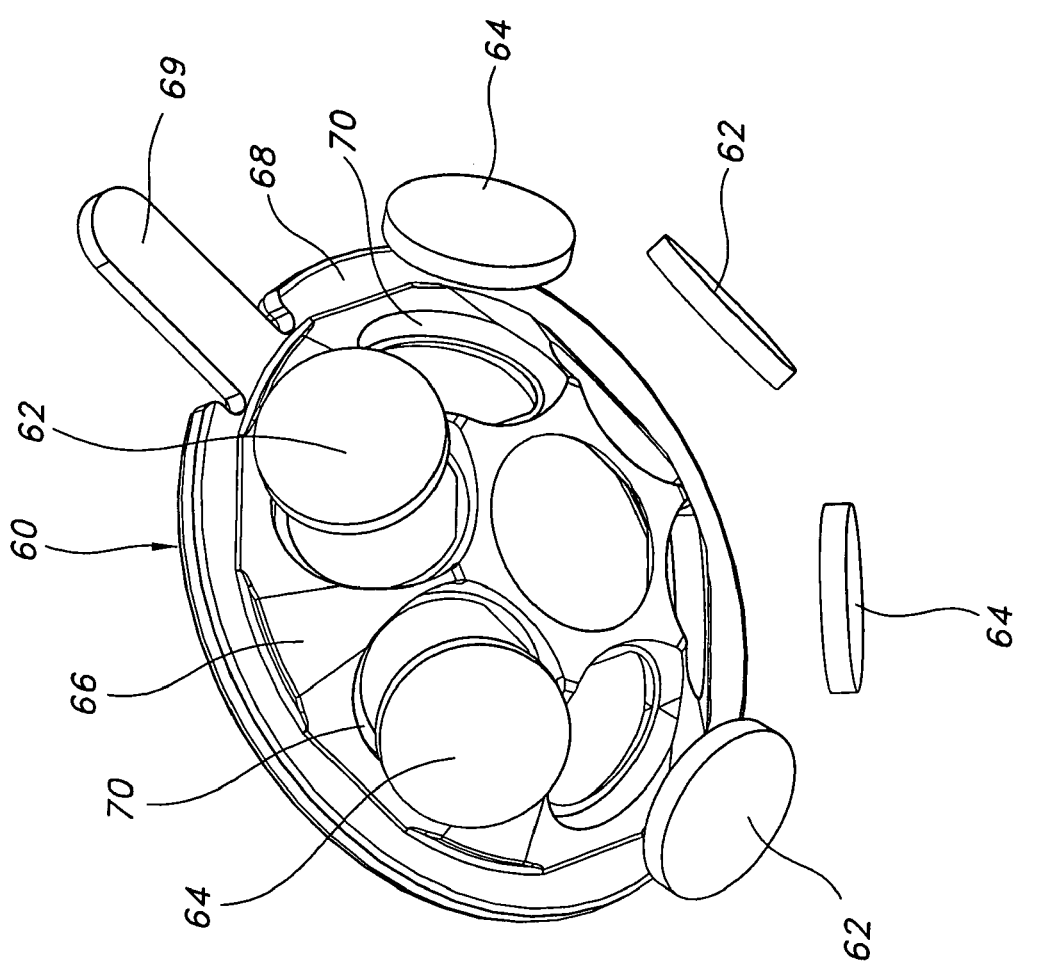
FIG. 6 is a perspective exploded view of the UV filter wheel.

The filter wheel assembly 16 is illustrated in greatest detail in FIG. 6. The filter wheel assembly 16 includes a wheel 60, three UV-filtering glasses 62, and three non-UV-filtering glasses 64. The wheel 60 has a frustoconical body 66 surrounded by a flat circular outwardly extending lip 68. A tab 69 extends radially from the wheel 60 to provide a mechanism for rotating or pivoting the wheel. The body 66 defines six openings 70 equally spaced about the periphery of the body at 60 degree intervals.

The three UV-filtering glasses 62 are mounted in three of the holes 70 at angles that are 120 degrees from one another. Similarly, the non-UV-filtering glasses are mounted in the three remaining holes at angles that also are 120 degrees from one another. Consequently, the UV-filtering and non-UV-filtering glasses alternate about the body 66.

Figure 4:
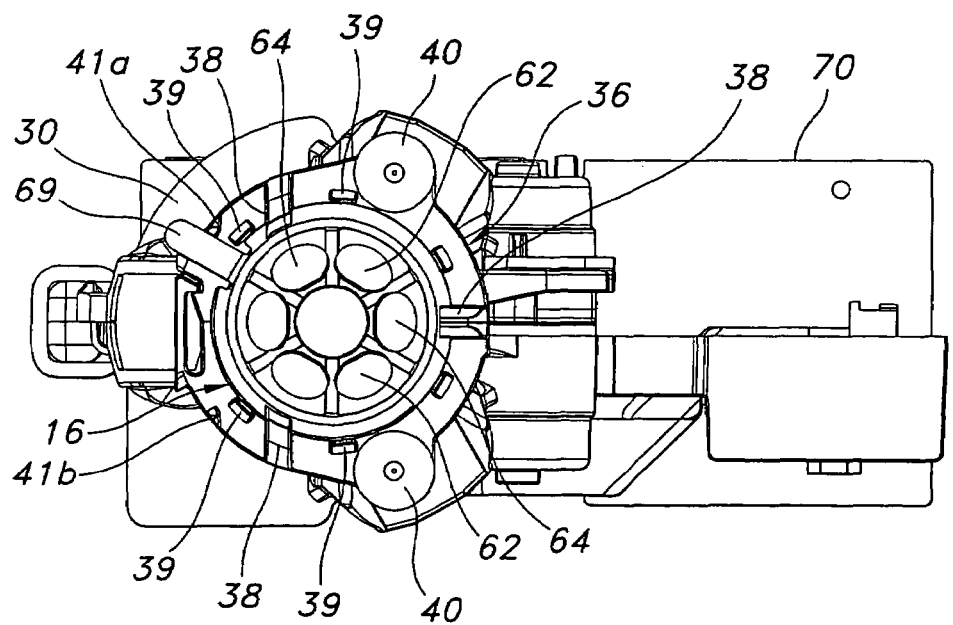
FIG. 4 is a bottom plan view of the color measurement engine showing the UV filter wheel in the UV-excluded position.
Figure 5:
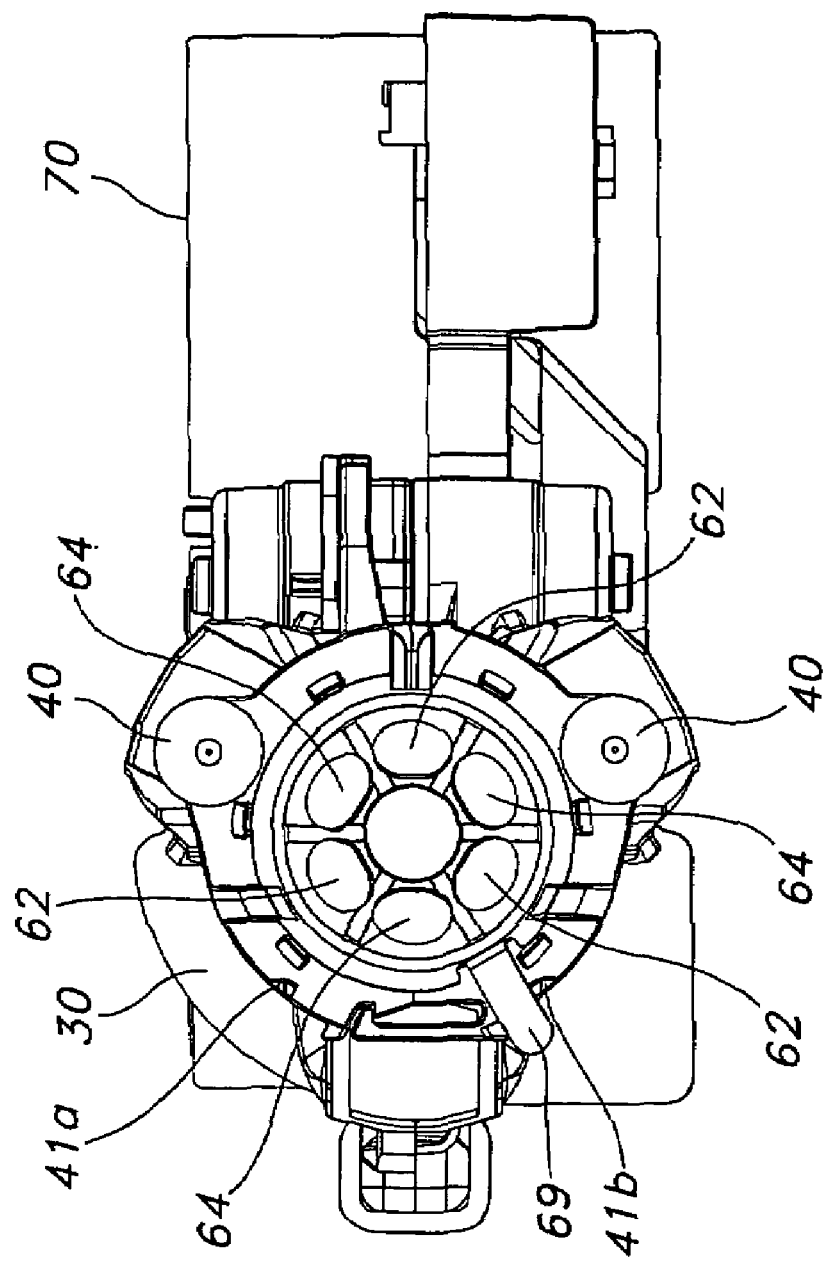
FIG. 5 is a bottom plan view of the color measurement engine showing the UV filter wheel in the UV-included position.

The filter wheel assembly 16 is supported by the lower portion 36 of the optics housing 34. More particularly, the wheel lip 68 is located within the guides 39 and under the tabs 38 to rotatably support the wheel. The travel of the tab 69 is limited (see particularly FIG. 4) between stops 41a and 41b. The filter wheel assembly 16 can rotate through an angle of 60 degrees between the stops 41. More particularly, the filter wheel can be placed either in a UV-excluded position (FIGS. 1 and 4) in which the UV filters 62 are aligned with the light tubes 22 or a UV-included position (FIG. 5) in which the non-UV glasses 64 are aligned with the light tubes 22. Preferably, a visual indicator (not shown) is provided on the engine 10 to indicate whether the tab 69, and therefore the wheel assembly 16, is in the UV-excluded or UV-included position.

The sensor assembly includes a circuit board 70 and a filter/sensor array 72. The printed circuit board 70 is of a type generally known to those skilled in the art and provides power to and control for the filter array assembly 72. The construction and programming of the devices on the board 70 will be known to one of ordinary skill in the art.

Figure 7:
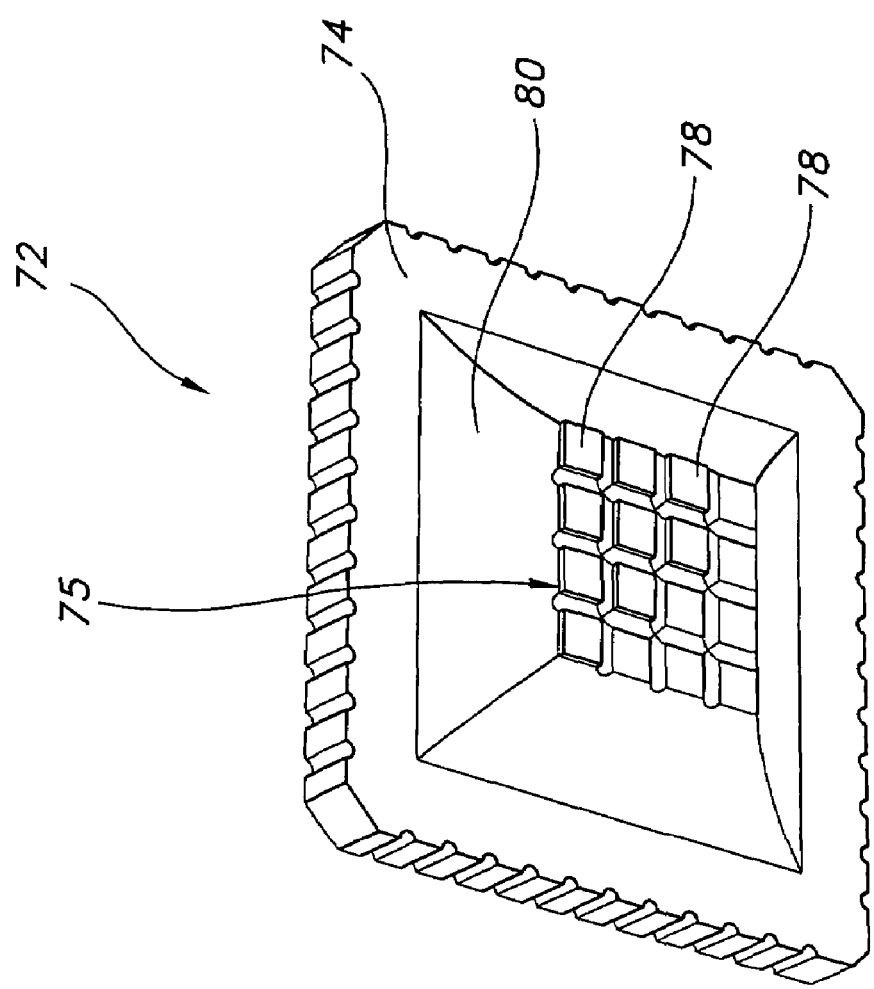
FIG. 7 is a perspective view of the filter/sensor array.
Figure 8:
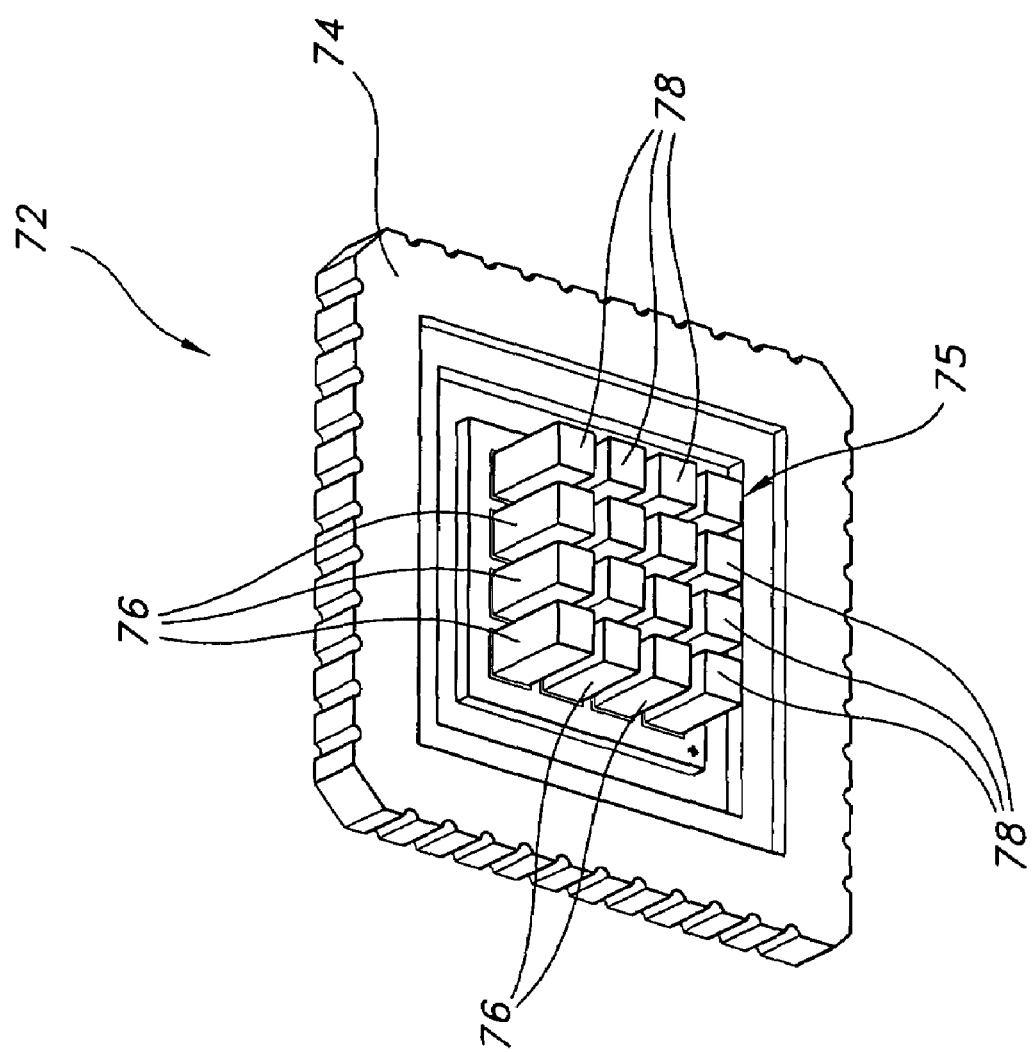
FIG. 8 is a perspective view similar to FIG. 7 but with the epoxy removed.

The filter/detector array assembly 72 is illustrated in FIGS. 7 and 8. The assembly 72 includes a substrate 74 and a plurality of filter/detector pairs 75, and potting 80. In the current embodiment, 16 pairs 75 are included in four-by-four array. Each pair 75 includes a photodiode 76 and a filter 78. The 16 bandpass filters are nominally centered at the following pass frequencies:

| Filter | Pass Frequency (nm) |
|---|---|
| 1 | 400 |
| 2 | 420 |
| 3 | 440 |
| 4 | 460 |
| 5 | 480 |
| 6 | 500 |
| 7 | 520 |
| 8 | 540 |
| 9 | 560 |
| 10 | 580 |
| 11 | 600 |
| 12 | 620 |
| 13 | 640 |
| 14 | 660 |
| 15 | 680 |
| 16 | 700 |

The filter/sensor pairs 75 are supported by the substrate 74 in conventional fashion. The opaque potting 80 can be a polymeric material, a silicone material, or epoxy. The potting provides structural integrity for the assembled unit, and reduces cross talk between the filter/sensor pairs 75.

Figure 9:
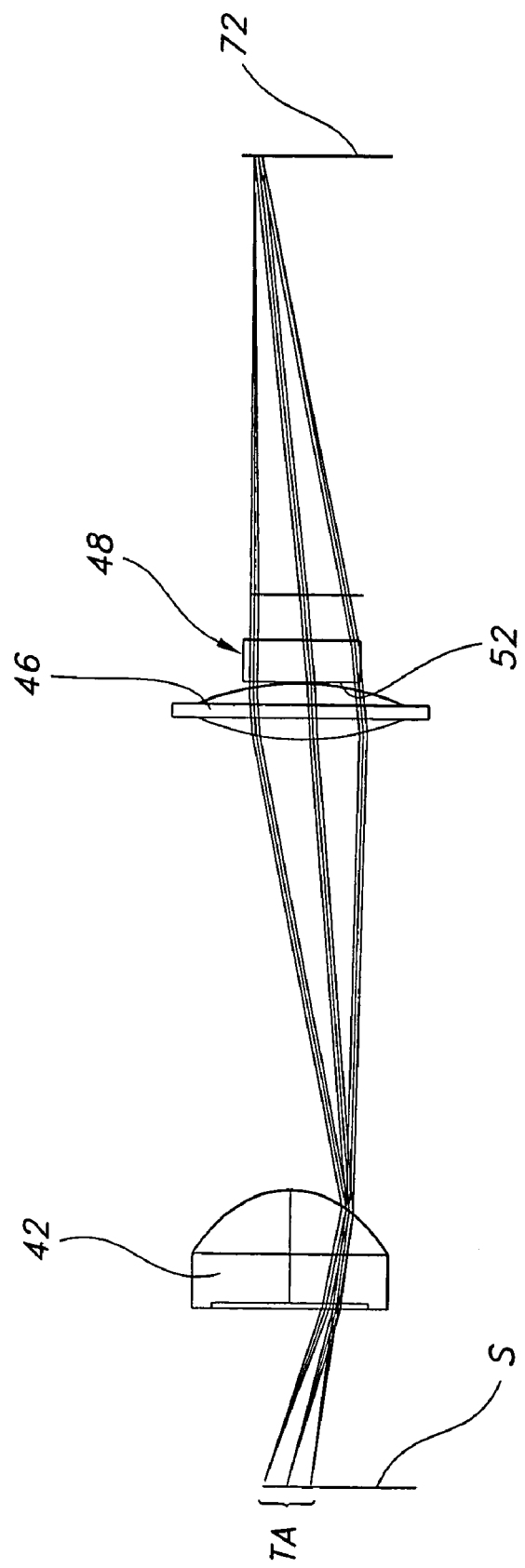
FIG. 9 is a schematic illustration of the optics of the color measurement engine.

The optics system 18 is schematically illustrated in FIG. 9. As set forth above, the optics system 18 includes an objective lens 42, a field lens 46, and a size-defining aperture 52. The optics system 18 directs light from each point (i.e. a plurality of points) in the target area TA of the sample S generally equally onto each of the filter/sensor pairs 75 in the array 72, so that each filter/detector pair 75 sees light from the entire target area TA. Consequently, each filter/sensor pair "sees" the same target area TA at the same intensity as do the other sensors.

The objective lens 42 images the spot-size defining aperture 52 onto the sample S to define the size of the target area TA. The aperture 52 therefore dictates the area of the sample S that contributes light to the filter/detector pairs 75 by direct paths through the lenses 42 and 46 and the common blocker 48. The optics system 18 clearly defines the target area TA of the sample S being measured (the spot)—highly rejecting light from outside the spot and uniformly accepting light from within the spot with a sharp boundary between the two. Furthermore, this sharply defined spot boundary is defined without contact with the sample. This sharp boundary is especially helpful when measuring many different color patches on a single sheet of paper because it allows accurate measurements of color patches not much larger than the spot size without unwanted influence of neighboring color patches. The clearly defined spot boundary also facilitates steering a sequence of patches past the color measurement engine.

In the current embodiment, the objective lens is a 12 millimeter (mm) diameter, 12 mm effective focal length (EFL) sphero-concave/aspheric-convex acrylic lens; and the field lens 46 is a 12.5 mm diameter, 16.95 mm EFL bi-convex acrylic lens. Further in the current embodiment, the distance between the sample S and the objective lens 42 is 11.2 mm; the distance between the objective lens 42 and the field lens 46 is 27.2 mm; the distance between the field lens 42 and the spot-size defining aperture 52 is 4.6 mm; and the distance between the aperture 52 and the array 72 is 32.7 mm.

Because each filter/sensor pair 75 sees the same image at the same time, the pairs can be read in parallel, improving the speed of a color measurement. Alternatively, the pairs 75 can be read serially, although serial reading is inherently slower than parallel reading. A further advantage of taking readings of the pairs 75 in parallel is that the various readings are not dependent on sequence or time.

The engine 10 includes a single optical system 18 to direct the light flux efficiently from the target area TA to the array 72. The optical system provides mixing of light from all areas of the target area to each filter/detector pair 75 and has a simple, single aperture that controls the size of the target area. The size of the target area can be changed by changing only one relatively low-cost part (i.e. the sizing aperture 52). Because the engine 10 uses a detector assembly 20 with a closely packed active area (i.e. the array 75), the radiometric efficiency is relatively high even with a relatively low-cost, two-lens optical system 18.

The above description is that of a preferred embodiment of the invention. Various changes and alterations can be made without departing from the spirit and broader aspects of the invention as defined in the appended claims, which are to be interpreted in accordance with the principles of patent law, including the doctrine of equivalents.

The invention claimed is:

1. A color measurement instrument comprising:
   an illuminator adapted to direct radiation onto a sample target area;
   a two-dimensional array of photodetectors adapted to receive radiation reflected from the sample target area, and adapted to be read in parallel; and
   optics adapted to direct light from a plurality of points in the sample target area generally equally onto each photodetector.

2. A color measurement instrument as defined in claim 1 further comprising a plurality of spectral filters each associated with one of said photodetectors, said spectral filters having non-identical filtering properties.

3. A color measurement instrument as defined in claim 1 wherein said photodetectors are arranged in a square array.

4. A color measurement instrument as defined in claim 3 wherein said array includes sixteen said photodetectors arranged in a four-by-four array.

5. A color measurement instrument as defined in claim 1 wherein said photodetectors are integral portions of a single substrate.

6. A photodetector assembly comprising:
   a one-piece substrate including a plurality of photodetectors arranged in a two-dimensional array;
   a plurality of spectral filters having non-identical filtering properties, each said spectral filter associated with one of said photodetectors; and
   optics adapted to direct light from each point in the sample target area generally equally onto each photodetector.

7. A photodetector assembly as defined in claim 6 wherein the filtering properties of each spectral filter are different from the filtering properties of the other spectral filters.

8. A photodetector assembly as defined in claim 6, wherein said photodetectors can be read in parallel.

9. A photodetector assembly as defined in claim 6 wherein said photodetectors are arranged in a square array.

10. A photodetector assembly as defined in claim 9 wherein sixteen of said photodetectors are arranged in a four-by-four array.

* * * * *